United States Patent
Hsieh

(10) Patent No.: US 8,443,951 B1
(45) Date of Patent: May 21, 2013

(54) RATCHET CYLINDER FOR A BICYCLE HUB

(76) Inventor: Te-Yao Hsieh, Taichung Hsien (TW)

(*) Notice: Subject to any disclaimer, the term of this patent is extended or adjusted under 35 U.S.C. 154(b) by 0 days.

(21) Appl. No.: 13/300,539

(22) Filed: Nov. 18, 2011

(51) Int. Cl.
*F16D 41/30* (2006.01)

(52) U.S. Cl.
USPC ............................................. 192/64; 192/46

(58) Field of Classification Search
USPC ................................... 192/64, 69.1
See application file for complete search history.

(56) References Cited

U.S. PATENT DOCUMENTS

| | | | | |
|---|---|---|---|---|
| 4,328,882 A * | 5/1982 | Isobe | ............................. | 192/64 |
| 6,202,813 B1 * | 3/2001 | Yahata et al. | ................... | 192/64 |
| 7,484,605 B2 * | 2/2009 | Pawley et al. | ................. | 192/43.1 |
| 7,938,241 B1 * | 5/2011 | Chen | ............................... | 192/64 |
| 8,276,731 B2 * | 10/2012 | Chen | ............................... | 192/64 |
| 2007/0089960 A1 * | 4/2007 | Kanehisa | ......................... | 192/64 |
| 2007/0131509 A1 * | 6/2007 | Kimes | ............................. | 192/46 |
| 2010/0252389 A1 * | 10/2010 | French | ............................ | 192/64 |
| 2011/0148183 A1 * | 6/2011 | Chen | .......................... | 301/110.5 |

* cited by examiner

*Primary Examiner* — Rodney Bonck
*Assistant Examiner* — Lillian Nguyen

(57) ABSTRACT

A ratchet cylinder for a bicycle hub is provided with a cylinder member, a plurality of ratchet teeth, a plurality of springs and a C-ring. The C-ring circles around the connecting end of the cylinder member and engages in the grooves of the respective ratchet teeth, so as to retain the ratchet teeth in the receiving grooves and allow the ratchet teeth to pivot within a limited angle. The springs are disposed between the ratchet teeth and the ratchet cylinder to keep pushing the respective ratchet teeth of the hub shell into an engagement position with the teeth of the hub shell, so that the ratchet teeth can be surely engaged with the teeth.

2 Claims, 4 Drawing Sheets

RATCHET CYLINDER FOR A BICYCLE HUB

BACKGROUND OF THE INVENTION

1. Field of the Invention

The present invention relates to a bicycle hub, and more particularly to a ratchet cylinder for a bicycle hub.

2. Description of the Prior Art

A conventional bicycle hub normally consists of hub shell formed with teeth, a ratchet cylinder, an axle and a plurality of bearings. The axle is inserted in the hub shell, the ratchet cylinder is formed around its periphery with a plurality of ratchet teeth for engaging with the teeth of the hub shell in a unidirectional manner, and the bearings are disposed between the axle and the respective components.

The ratchet teeth of the ratchet cylinder are retained by a relatively rigid C-ring. When in rotation, the hub shell drives the ratchet cylinder through the engagement of the teeth and the ratchet teeth, and when in a reverse rotation, the teeth press down the ratchet teeth to make the ratchet cylinder idle. If the ratchet cylinder is only provided with three ratchet teeth, which won't affect the C-ring since the distance between the ratchet teeth is relatively large. However, when there are six ratchet teeth on the ratchet cylinder, the effect of the C-ring for retaining the ratchet teeth will be adversely affected due to the ratchet teeth are disposed at a relatively short distance from one another, causing misalignment of the ratchet teeth.

Hence, the C-ring is replaced with a circular elastic clasp, the elasticity of the elastic clasp can overcome the bad retaining effect of the rigid C-ring, however, the circular elastic clasp is difficult to produce. Moreover, the elastic clasp has elastic fatigue problem.

The present invention has arisen to mitigate and/or obviate the afore-described disadvantages.

SUMMARY OF THE INVENTION

The primary object of the present invention is to provide a ratchet cylinder for a bicycle hub, in normal conditions; the springs keep pushing the respective ratchet teeth of the hub shell into an engagement position with the teeth of the hub shell, so that the ratchet teeth can be surely engaged with the teeth.

To achieve the above object, a ratchet cylinder for a bicycle hub used in cooperation with a hub shell, around an inner surface at one end of the hub shell is formed a plurality of teeth, the ratchet cylinder comprises a cylinder member, a plurality of ratchet teeth, a plurality of springs and a C-ring.

The cylinder member is formed with a connecting end at one end thereof, around the connecting end being formed a plurality of arc-shaped receiving grooves, and adjacent the respective receiving grooves is formed a plurality of restricting grooves. The plurality of ratchet teeth each includes a pivot portion, an engaging portion and a groove, the pivot portion includes an arc-shaped surface, the pivot portion of the respective ratchet teeth is received in the respective receiving grooves in such a manner that the arc-shaped surface is abutted against a bottom of the receiving grooves. The plurality of springs each have one end inserted in the restricting grooves and another pressed against the engaging portion of the respective ratchet teeth, in normal condition, the springs keep pushing the engaging portions of the respective ratchet teeth into the receiving grooves. The metal C-ring circles around the connecting end of the cylinder member and engages in the grooves of the respective ratchet teeth, so as to retain the ratchet teeth in the receiving grooves and allow the ratchet teeth to pivot within a limited angle. The connecting end of the cylinder member is inserted in the hub shell in such a manner that the ratchet teeth of the cylinder member face the teeth of the hub shell, and the ratchet teeth will be engaged with the teeth of the hub shell in a unidirectional manner when the hub shell rotates.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
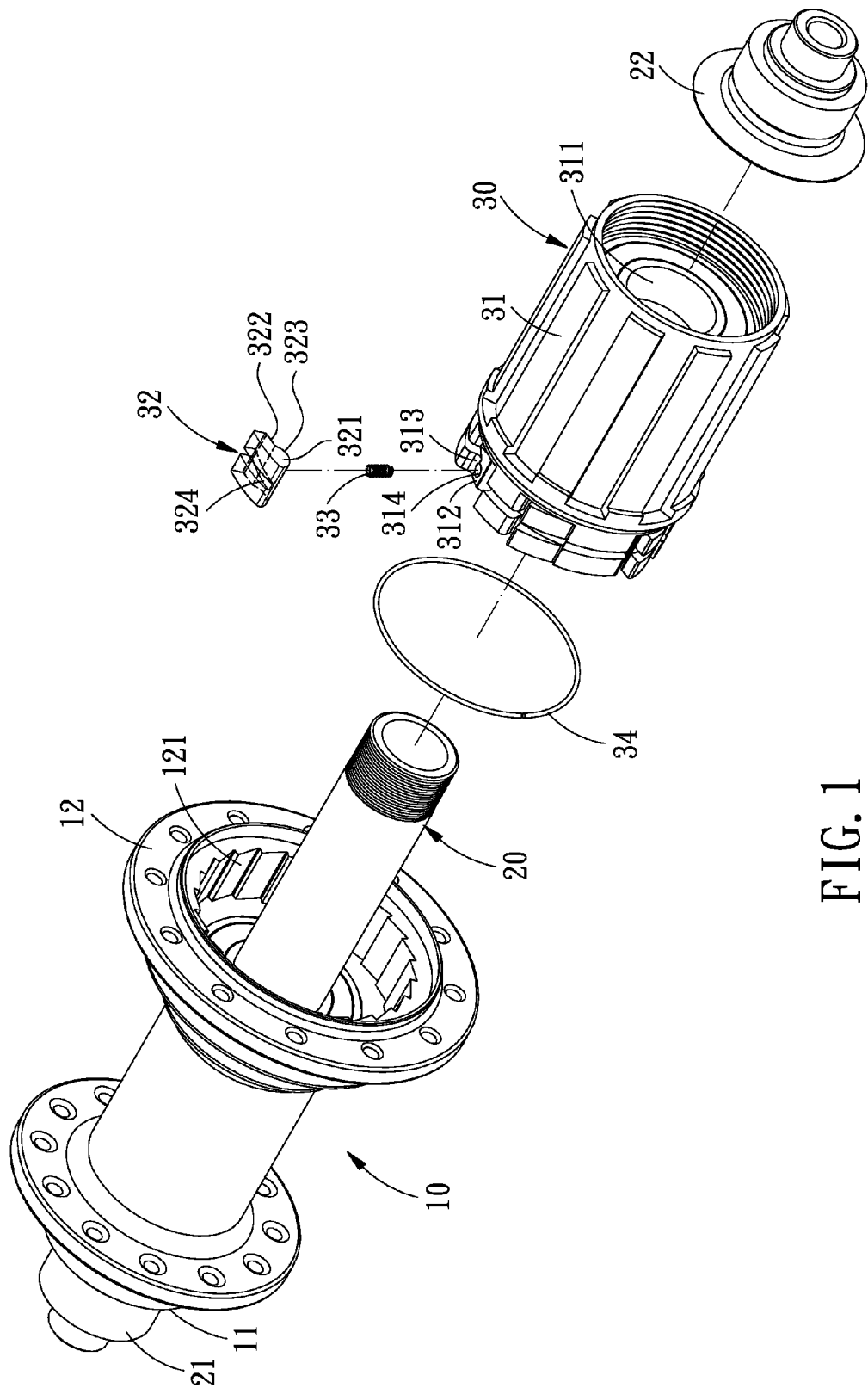
FIG. 1 is an exploded view of a ratchet cylinder for a bicycle hub in accordance with the present invention.
Figure 2:
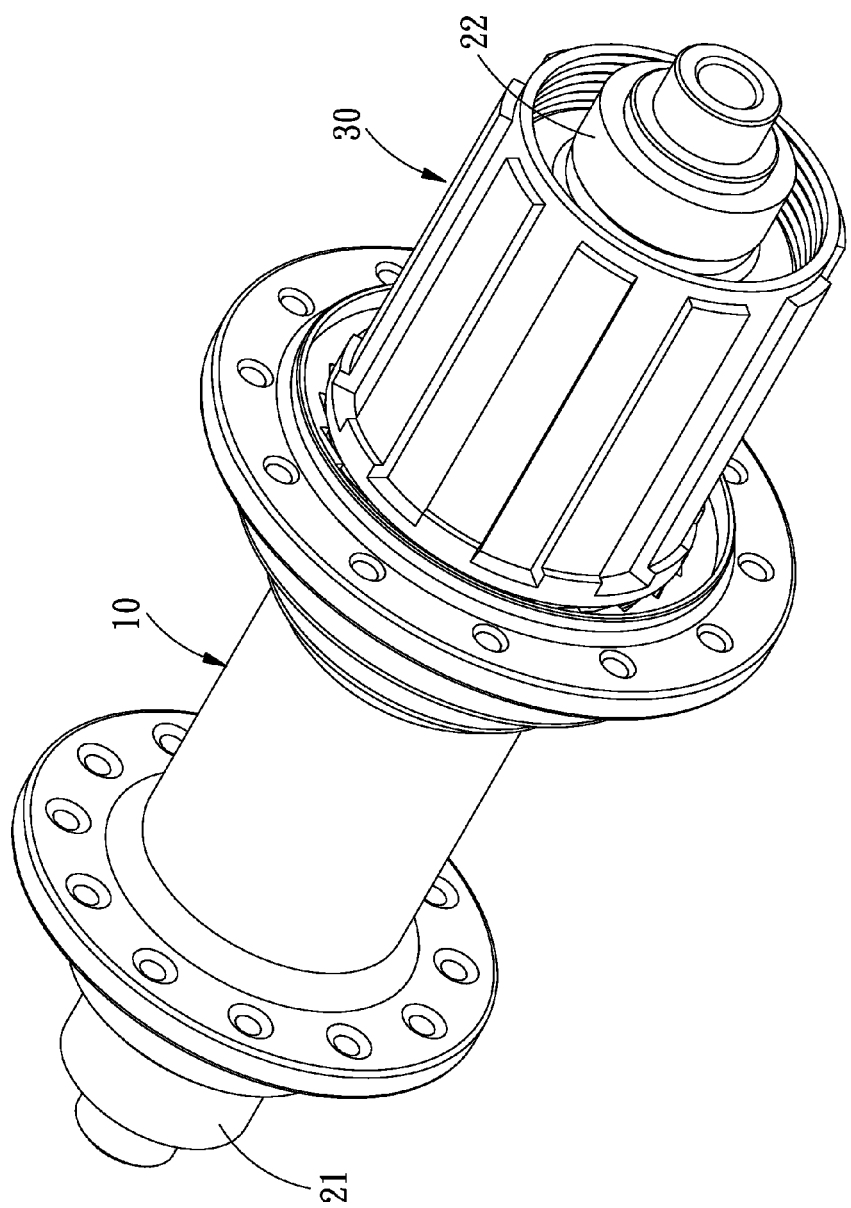
FIG. 2 is a perspective view of the ratchet cylinder for a bicycle hub in accordance with the present invention.
Figure 3:
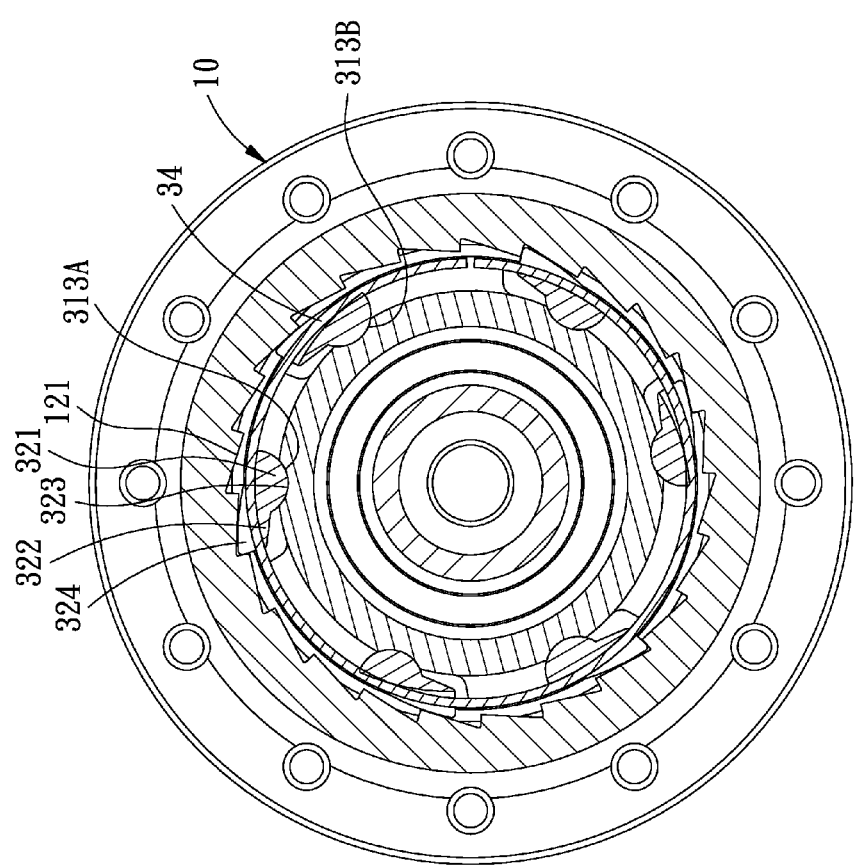
FIG. 3 is a cross sectional view of the ratchet cylinder for a bicycle hub in accordance with the present invention.
Figure 4:
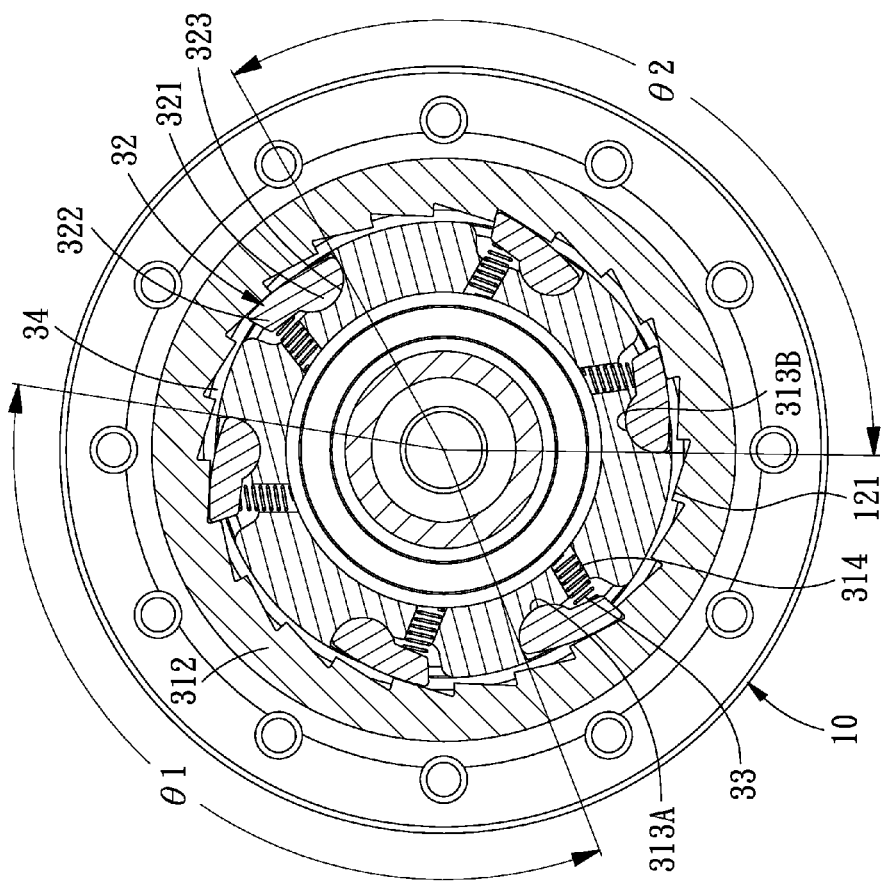
FIG. 4 is another cross sectional view of the ratchet cylinder for a bicycle hub in accordance with the present invention.

Referring to FIGS. 1-4, a ratchet cylinder for a bicycle hub in accordance with the present invention is used in cooperation with a hub shell 10 and an axle 20.

The hub shell 10 includes a first end 11 and a second end 12, and the second end 12 is provided around its inner surface with a plurality of teeth 121.

The axle 20 is inserted in the hub shell 10 in such a manner that one end of the axle 20 extends out of the first end 11 of the hub shell 10 and screwed with a nut 21 and the other end of the axle 20 extends out of the second end 12 of the hub shell 10.

The ratchet cylinder 30 includes a cylinder member 31, a plurality of ratchet teeth 32, a plurality of springs 33 and a C-ring 34.

The cylinder member 31 is formed with a central hole 311. At one end of the cylinder member 31 is formed a connecting end 312, around the connecting end 312 is formed a plurality of arc-shaped receiving grooves 313 which are spaced apart and equiangularly arranged for receiving the ratchet teeth 32, and adjacent the respective receiving grooves 313 is formed a plurality of restricting grooves 314.

The receiving grooves 313 includes a plurality of first and second receiving grooves 313A, 313B that are alternatively arranged in such a manner that each two neighboring first receiving grooves 313A define a first rotation angle $\theta 1$ therebetween, and each two neighboring second receiving grooves 313B define a second rotation angle $\theta 2$ therebetween, and the first and second rotation angles $\theta 1$, $\theta 2$ are not equal to each other, namely, there is an angle difference between the angles $\theta 1$ and $\theta 2$.

The ratchet teeth 32 each include a pivot portion 321, an engaging portion 322 and a groove 324. The pivot portion 321 includes an arc-shaped surface 323. The pivot portion 321 of the respective ratchet teeth 32 is received in the respective receiving grooves 313 in such a manner that the arc-shaped surface 323 is abutted against the bottom of the receiving grooves 313.

The respective springs 33 each have one end inserted in the restricting grooves 314 and another pressed against the engaging portion 322 of the respective ratchet teeth 32, so that the springs 33 are disposed between the ratchet teeth 32 and the cylinder member 31. In normal condition, the springs 33 push the engaging portions 322 of the respective ratchet teeth 32 outward to allow the engaging portions 322 to be better positioned in the receiving grooves 313.

The C-ring 34 is a metal structure which circles around the connecting end 312 of the cylinder member 31 and engages in the grooves 324 of the respective ratchet teeth 32, so as to retain the ratchet teeth 32 in the receiving grooves 313 in such a manner that the pivot portions 321 of the respective ratchet teeth 32 cooperate with the arc-shaped receiving grooves 313 to allow the ratchet teeth 32 to pivot with respect to the arc-shaped receiving grooves 313.

The ratchet cylinder 30 is inserted on the end of the axle 20 that extends out of the second end 12 of the hub shell 10, and the connecting end 312 of the cylinder member 31 is disposed at the second end 12 of the hub shell 10 in such a manner that the ratchet teeth 32 of the cylinder member 31 face the teeth 121 of the hub shell 10, and the axle 20 is inserted in the ratchet cylinder 30 and screwed with a nut 22.

When the hub shell 10 rotates clockwise, the teeth 121 of the hub shell 10 engage with the ratchet teeth 32 of the ratchet cylinder 30, so that the hub shell 10 can be driven to rotate by the ratchet cylinder 30, namely, the wheel of the bicycle can rotate. Further, in normal conditions, the springs 33 between the ratchet teeth 32 and the cylinder member 31 keep pushing the respective ratchet teeth 32 into an engagement position with the teeth 121 of the hub shell 10, so that the ratchet teeth 32 can be surely engaged with the teeth 121.

When the hub shell 10 is driven to rotate in counterclockwise direction, the teeth 121 of the hub shell 10 will press the ratchet teeth 32, and then the ratchet teeth 32 of the ratchet cylinder 30 will compress the springs 33, consequently the springs 33 will make the ratchet teeth 32 pivot in the receiving grooves 313. At this moment, the ratchet teeth 32 are unable to engage with the teeth 121, so as to make the hub shell 10 idle. After each time the ratchet teeth 32 are pushed down, the springs 33 will be decompressed to push the ratchet teeth 32 back to the original position where the ratchet teeth 32 can engage with the teeth 121 of the hub shell 10 in normal conditions.

The C-ring 34 is made of metal, which not only reduces the cost of the C-ring 34 but also makes the C-ring 34 easy to produce. The metal C-ring 34 can retain the ratchet teeth 32 and enable the ratchet teeth 32 to only pivot within a limited angle. Furthermore, with the springs 33 pushing the engaging portion 322 of the respective ratchet teeth 32, the pivot portions 321 of the ratchet teeth 32 can be surely received in the receiving grooves 313, which not only adds to the structural stability of the present invention, but also ensures that the pivot motion of the ratchet teeth 32 can be smoothly carried out. Besides, the metal C-ring 34 has less elastic fatigue problem.

On top of that, the receiving grooves 313 includes a plurality of first and second receiving grooves 313A, 313B that are alternatively arranged, and there is an angle difference between the first rotation angle θ1 of the first receiving grooves 313A and the second rotation angle θ2 of the second receiving grooves 313B. Hence, the teeth 121 of the hub shell 10 are selectively engaged with the ratchet teeth 32 in the first receiving grooves 313A or the ratchet teeth 32 in the second receiving grooves 313B at a time. Only rotating a small angle of the angle difference between the first and second rotation angles θ1, θ2 can make the teeth 121 of the hub shell 10 engage with the ratchet teeth 32 of the ratchet cylinder 30, namely, can make the ratchet cylinder 30 rotate the hub shell 10, improving engaging efficiency.

While we have shown and described various embodiments in accordance with the present invention, it should be clear to those skilled in the art that further embodiments may be made without departing from the scope of the present invention.

What is claimed is:

1. A ratchet cylinder for a bicycle hub used in cooperation with a hub shell, around an inner surface at one end of the hub shell being formed a plurality of teeth, the ratchet cylinder comprising:
   a cylinder member formed with a connecting end at one end thereof, around the connecting end being formed a plurality of arc-shaped receiving grooves, and adjacent the respective receiving grooves is formed a plurality of restricting grooves;
   a plurality of ratchet teeth each including a pivot portion, an engaging portion and a groove, the pivot portion including an arc-shaped surface, the pivot portion of the respective ratchet teeth being received in the respective receiving grooves in such a manner that the arc-shaped surface is abutted against a bottom of the receiving grooves;
   a plurality of springs each having one end inserted in the restricting grooves and another pressed against the engaging portion of the respective ratchet teeth, in normal condition, the springs keep pushing the engaging portions of the respective ratchet teeth into the receiving grooves; and
   a metal C-ring circling around the connecting end of the cylinder member and engaging in the grooves of the respective ratchet teeth, so as to retain the ratchet teeth in the receiving grooves and allow the ratchet teeth to pivot within a limited angle;
   the connecting end of the cylinder member being inserted in the hub shell in such a manner that the ratchet teeth of the cylinder member face the teeth of the hub shell, and the ratchet teeth will be engaged with the teeth of the hub shell in a unidirectional manner when the hub shell rotates;
   wherein the receiving grooves include a plurality of first and second receiving grooves, that are alternatively arranged in such a manner that each two neighboring first receiving grooves define a first rotation angle therebetween, and each two neighboring second receiving grooves define a second rotation angle therebetween, and the first and second rotation angles are not equal to each other, namely, there is an angle difference between the angles.

2. The ratchet cylinder for a bicycle hub as claimed in claim 1 being used in cooperation with an axle which is inserted in the hub shell and the ratchet cylinder in such a manner that both ends of the axle extend out of the hub shell and screwed with a nut, respectively.

* * * * *